United States Patent
Jeong

(10) Patent No.: US 10,616,943 B2
(45) Date of Patent: *Apr. 7, 2020

(54) TERMINAL FOR SUPPORTING DEVICE TO DEVICE COMMUNICATION AND METHOD FOR OPERATING SAME

(71) Applicant: Samsung Electronics Co., Ltd., Gyeonggi-do (KR)

(72) Inventor: Kyeongin Jeong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/005,280

(22) Filed: Jun. 11, 2018

(65) Prior Publication Data

US 2018/0332644 A1    Nov. 15, 2018

Related U.S. Application Data

(63) Continuation of application No. 14/898,728, filed as application No. PCT/KR2014/007077 on Jul. 31, 2014, now Pat. No. 9,999,081.

(30) Foreign Application Priority Data

Jul. 31, 2013  (KR) ........................ 10-2013-0091180

(51) Int. Cl.
  *H04W 76/14*    (2018.01)
  *H04W 72/02*    (2009.01)
  *H04W 28/02*    (2009.01)

(52) U.S. Cl.
  CPC ....... *H04W 76/14* (2018.02); *H04W 28/0278* (2013.01); *H04W 72/02* (2013.01)

(58) Field of Classification Search
  None
  See application file for complete search history.

(56) References Cited

U.S. PATENT DOCUMENTS 7,792,130 B2    9/2010  Fischer
9,467,930 B2    10/2016  Lim et al.
(Continued)

FOREIGN PATENT DOCUMENTS

EP  2741563 A1  10/2015
GB  2507490 A   5/2014
(Continued)

OTHER PUBLICATIONS

"D2D Communication Resource Allocation Mode 1," 3GPP TSG RAN WG2 Meeting #85bis, R2-141195, CATT, Valencia, Spain, Mar. 31-Apr. 4, 2014, 3 pages.
(Continued)

*Primary Examiner* — Kodzovi Acolatse

(57) ABSTRACT

An embodiment of the present invention provides a terminal including a PDCP layer which relays a D2D-dedicated IP packet from an upper layer to a lower layer, an RLC layer which processes the received packet in adaptation to the radio channel condition and transfers the processed data to a MAC layer, and a MAC layer which selects, when D2D packet data come into being, resources for D2D link without requesting scheduling from the eNB and multiplexes the data received through D2D-dedicated logical channels, and an operation method of the terminal. Particularly, an embodiment of the present invention provides a novel MAC operation method of a terminal supporting D2D communication.

18 Claims, 13 Drawing Sheets

(56) References Cited

U.S. PATENT DOCUMENTS

| | | | |
|---|---|---|---|
| 2006/0154673 | A1 | 7/2006 | Khitrik et al. |
| 2009/0016225 | A1 | 1/2009 | Laroia et al. |
| 2010/0240312 | A1 | 9/2010 | Peng et al. |
| 2012/0207100 | A1 | 8/2012 | Hakola et al. |
| 2013/0150108 | A1 | 6/2013 | Yang et al. |
| 2013/0157669 | A1 | 6/2013 | Turtinen et al. |
| 2013/0178221 | A1 | 7/2013 | Jung et al. |
| 2013/0322276 | A1 | 12/2013 | Pelletier et al. |
| 2013/0322413 | A1 | 12/2013 | Pelletier et al. |
| 2014/0206372 | A1 | 7/2014 | Zeng et al. |
| 2014/0211702 | A1 | 7/2014 | Turtinen et al. |
| 2014/0254523 | A1 | 9/2014 | Chai et al. |
| 2015/0071212 | A1* | 3/2015 | Kim .............. H04W 76/14 370/329 |
| 2015/0163689 | A1* | 6/2015 | Lee .............. H04W 76/14 370/328 |
| 2015/0304896 | A1* | 10/2015 | Turtinen .............. H04W 76/14 370/331 |
| 2015/0312821 | A1* | 10/2015 | Yamazaki .............. H04W 76/14 370/338 |
| 2015/0334714 | A1 | 11/2015 | Wang et al. |
| 2015/0334756 | A1* | 11/2015 | Lu .............. H04W 76/14 370/329 |
| 2016/0105878 | A1* | 4/2016 | Zhao .............. H04L 1/1887 370/329 |
| 2016/0113001 | A1 | 4/2016 | Iwamura et al. |
| 2016/0194986 | A1* | 7/2016 | Yamazaki .............. H04W 72/04 184/6.4 |

FOREIGN PATENT DOCUMENTS

| | | |
|---|---|---|
| JP | 5063781 B2 | 10/2012 |
| KR | 10-2012-0074254 A1 | 7/2012 |
| KR | 10-2013-0063644 A1 | 6/2013 |
| KR | 10-2013-0065373 A1 | 6/2013 |
| RU | 2221335 C2 | 1/2004 |
| RU | 2011142449 A | 4/2013 |
| WO | 2010/000655 A1 | 1/2010 |
| WO | 2010/109303 A2 | 9/2010 |
| WO | 2012/144320 A1 | 10/2012 |
| WO | 2013/025057 A2 | 2/2013 |
| WO | 2013/052163 A1 | 4/2013 |
| WO | 2013044718 A1 | 4/2013 |
| WO | 2013/075635 A1 | 5/2013 |

OTHER PUBLICATIONS

Foreign Communication From a Related Counterpart Application, Australian Application No. 2014296952, Examination Report No. 1 for Standard Patent Application dated Jan. 9, 2017, 6 pages.

Foreign Communication From a Related Counterpart Application, European Application No. 14832737.2-1854, Extended European Search Report dated Feb. 2, 2017, 52 pages.

International Search Report dated Nov. 20, 2014 in connection with International Patent Application No. PCT/KR2014/007077, 4 pages.

Balaji Raghothaman, et al., "Architecture and Protocols for LTE-Based Device to Device Communication", Computing, 2013 International Conference on Networking and Communications (ICNC), Jan. 31, 2013, pp. 895-899.

Written Opinion of the International Searching Authority dated Nov. 20, 2014 in connection with International Patent Application No. PCT/KR2014/07077, 6 pages.

Official Action dated Jul. 13, 2016 in connection with Russian Application No. 2015153385, 8 pages.

Partial Supplementary European Search Report dated Sep. 21, 2016 in connection with European Application No. 14832737.2, 10 pages.

Jaakko Seppala, et al., "Network Controlled Device-to-Device (D2D) and Cluster Multicast Concept for LTE and LTE-A Networks", 2001 IEEE Wireless Communications and Networking Conference, Cancun, Mexico, Mar. 28-31, 2011, pp. 986-991.

Alcatel-Lucent, et al., "BSR for D2D", 3GPP TSG-RAN WG2 Meeting #86, Seoul, Korea, May 19-23, 2014, 5 pages Balaji Raghothaman, et al., "Architecture and Protocols for LTE-based Device to Device Communication", 2013 International Conference on Computing, Networking and Communications, IEEE, San Diego, California, Jan. 28-31, 2013, 5 pages.

Office Action dated Jun. 14, 2018 in connection with European Patent Application No. 14 832 737.2.

Xiaoyue Zhu et al., "QoS-based Resource Allocation Scheme for Device-to-Device (D2D) Radio Underlaying Cellular Networks", 19th International Conference on Telecommunications (ICT 2012), Apr. 23, 2012, 6 pages.

"3rd Generation Partnership Project; Technical Specification Group Radio Access Network; Evolved Universal Terrestrial Radio Access (E-UTRA); Medium Access Control (MAC) protocol specification (Release 11)", 3GPP TS 36.321 v11.3.0, Jun. 2013, 57 pages.

Office Action dated Oct. 24, 2019 in connection with India Patent Application No. 11314/DELNP/2015, 6 pages.

Partial European Search Report dated Jan. 31, 2020 in connection with European Patent Application No. 19 19 7760, 17 pages.

* cited by examiner

TERMINAL FOR SUPPORTING DEVICE TO DEVICE COMMUNICATION AND METHOD FOR OPERATING SAME

CROSS-REFERENCE TO RELATED APPLICATIONS AND CLAIM OF PRIORITY

This application is a continuation of U.S. patent application Ser. No. 14/898,728 filed on Dec. 15, 2015, which is a 371 of International Patent Application No. PCT/KR2014/007077 filed on Jul. 31, 2014, which claims priority to Korean Patent Application No. 10-2013-0091180 filed on Jul. 31, 2013, the disclosures of which are herein incorporated by reference in their entirety.

TECHNICAL FIELD

The present invention relates to a terminal supporting Device-to-Device communication and an operation method thereof. In particular, the present invention relates to a Medium Access Control (MAC) layer operation method of a terminal supporting the Device-to-Device (D2D) communication in a wireless mobile communication system.

BACKGROUND

Mobile communication systems were developed to provide the subscribers with voice communication services on the move. Recently, the mobile communication systems have evolved to the level of supporting high speed data communication services beyond the early voice-oriented services. However, the resource shortage and user requirements for higher speed services spur the evolution to more advanced mobile communication systems. Recently, standardization for a Long Term Evolution (LTE)/LTE-Advanced (LTE-A) system, as one of the next-generation mobile communication systems, is underway in the $3^{rd}$ Generation Partnership Project (3GPP). LTE is a technology designed to provide high speed packet-based communication of up to 100 Mbps. With the diversification of the types of services using wireless mobile communication system, there is a need of a new technology for supporting the newly introduced service more efficiently and, as a consequence, research and the development of new methods and technologies are being conducted for use in the wireless mobile communication system.

The Device to Device (D2D) communication is a technology being researched to make it possible for a terminal to communicate with neighboring terminals directly. The D2D communication technology makes it possible for a UE to discover other UEs located nearby and communicated with another UE directly if necessary. With the D2D communication technology, the terminal can discover neighboring terminals (hereinafter, referred to as D2D-D) and perform Direct Communication with a target terminal (hereinafter, referred to as D2D-C). The D2D communication is advantageous in terms of radio resource efficiency in comparison to the legacy radio network-assisted communication via a base station. Since the D2D communication support a neighboring terminal discovery function in which the terminal is capable of sending necessary information to a target terminal directly, it is possible to support the new services such as Social Networking Service (SNS) and advertisement service efficiently.

SUMMARY

The present invention aims to provide a terminal supporting D2D communication efficiently and operation method thereof in a wireless mobile communication system. An embodiment of the present invention provides an operation method of a Medium Access Control (MAC) layer of the enhanced terminal to solve the above problems.

According to an embodiment of the present invention, a terminal supporting Device-to-Device (D2D) communication is capable of requesting scheduling in such a way of receiving Tx data from an upper sublayer, determining whether the data is received through a D2D-dedicated logical channel, skipping, when the data is received through the D2D-dedicated logical channel, the scheduling request operation, selecting D2D resources for transmitting the data, and transmitting the data using the selected D2D resources.

Also, the terminal is capable of reporting buffer status in such a way of receiving data from the upper sub-layer, determining, when the BSR is triggered, whether there is any data received through a D2D-dedicated logical channel among the data, counting out the data received through the D2D-dedicated logical channel in calculating the buffer size according to the determination result, counting in the data received through non-D2D-dedicated logical channels in calculating buffer size per logical channel group, and transmitting a message including the buffer status report generated based on the calculated buffer size.

Also, the terminal is capable of managing an uplink timing in such a way of receiving the UL Tx Timing Advance Command from the eNB, determining whether the UL Tx data are supposed to be transmitted through a D2D link, transmitting, when the UL Tx data are supposed to be transmitted through the D2D link, the data by applying the UL Tx Timing Advance Command, and transmitting, when the UL Tx data are not supposed to be transmitted through the D2D link, the data without applying the UL Tx Timing Advance Command.

Also, the terminal includes a PDCP layer which relays a D2D-dedicated IP packet from an upper layer to a lower layer, an RLC layer which processes the received packet in adaptation to the radio channel condition and transfers the processed data to a MAC layer, and a MAC layer which selects, when D2D packet data come into being, resources for D2D link without requesting scheduling from the eNB and multiplexes the data received through D2D-dedicated logical channels.

According to an embodiment of the present invention, a multiplexing method of a terminal supporting Device-to-Device (D2D) communication includes receiving data through a logical channel in the terminal, determining whether a transport block into which the data are multiplexed is reserved for transmission through a D2D link, multiplexing, when the transport block is reserved for transmission through the D2D link, the data received through at least one D2D-dedicated logical channel.

According to an embodiment of the present invention, a control information transmission method of a terminal supporting Device-to-Device communication includes receiving data from an upper sublayer in the terminal, determining whether the received data include data received through a D2D-dedicated logical channel, and transmitting, when the received data include data received through the D2D-dedicated logical channel, a D2D-dedicated control message to a base station serving the terminal.

The present invention is advantageous in terms of proving a novel L2 layer structure of the terminal supporting the D2D communication function.

Also, the present invention is advantageous in terms of providing a novel scheduling request operation of the terminal supporting the D2D communication function.

Also, the present invention is advantageous in terms of providing a novel buffer status report operation of the terminal supporting the D2D communication function.

Also, the present invention is advantageous in terms of providing a novel multiplexing operation of the terminal supporting the D2D communication function.

Also, the present invention is advantageous in terms of providing a novel uplink timing management operation of the terminal supporting the D2D communication system.

DETAILED DESCRIPTION

Hereinafter, the present invention will be described in further detail by explaining exemplary embodiments with reference to the attached drawings in order for those skilled in the art to practice easily. The present invention may, however, be embodied in many different forms, and should not be construed as limited to the embodiments set forth herein. Detailed description of well-known functions and structures incorporated herein may be omitted to avoid obscuring the subject matter of the present invention, the same reference numbers are used throughout the drawings to refer to the same or like parts.

Exemplary embodiments of the present invention are described with reference to the accompanying drawings in detail.

Figure 1:
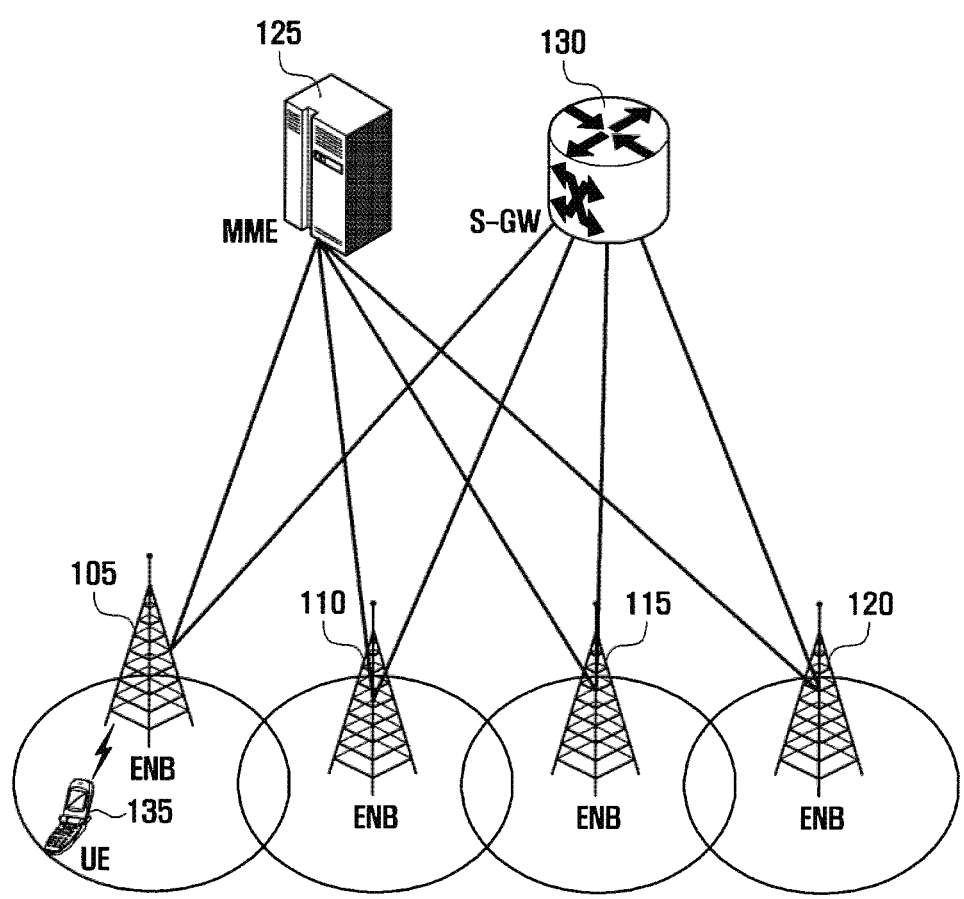
FIG. 1 is a conceptual diagram illustrating the 3GPP system architecture to which the present invention is applied.

FIG. 1 is a conceptual diagram illustrating the architecture of an LTE system to which the present invention is applied. Referring to FIG. 1, a Radio Access Network of the LTE system includes evolved Node Bs (eNBs) 105, 110, 115, and 120, a Mobility Management Entity (MME) 125, and a Serving-Gateway (S-GW) 130. The User Equipment (hereinafter, referred to as UE) 135 connects to an external network via the eNBs 105, 110, 115, and 120 and the S-GW 130. The eNBs 105, 110, 115, and 120 correspond to the legacy node Bs of the UMTS system. The eNBs 105, 110, 115, and 120 allow the UE 135 to establish a radio channel and are responsible for functions more complicated as compared to the legacy node B. In the LTE system, all the user traffic services including real time services such as Voice over Internet Protocol (VoIP) are provided through a shared channel and thus there is a need of a device to schedule data based on the state information (such as buffer status, power headroom status, and channel condition of the UE), the eNBs 105, 110, 115, and 120 being responsible for such functions. Typically, one eNB controls a plurality of cells. In order to secure the data rate of up to 100 Mbps, the LTE system adopts Orthogonal Frequency Division Multiplexing (OFDM) as a radio access technology in up to 20 MHz bandwidth. Also, the LTE system adopts Adaptive Modulation and Coding (AMC) to determine the modulation scheme and channel coding rate in adaptation to the channel condition of the UE. The S-GW 130 is an entity to provide data bearers so as to establish and release data bearers under the control of the MME 125. The MME 125 is responsible for mobility management of UEs and various control functions and may be connected to a plurality of eNBs.

Figure 2:
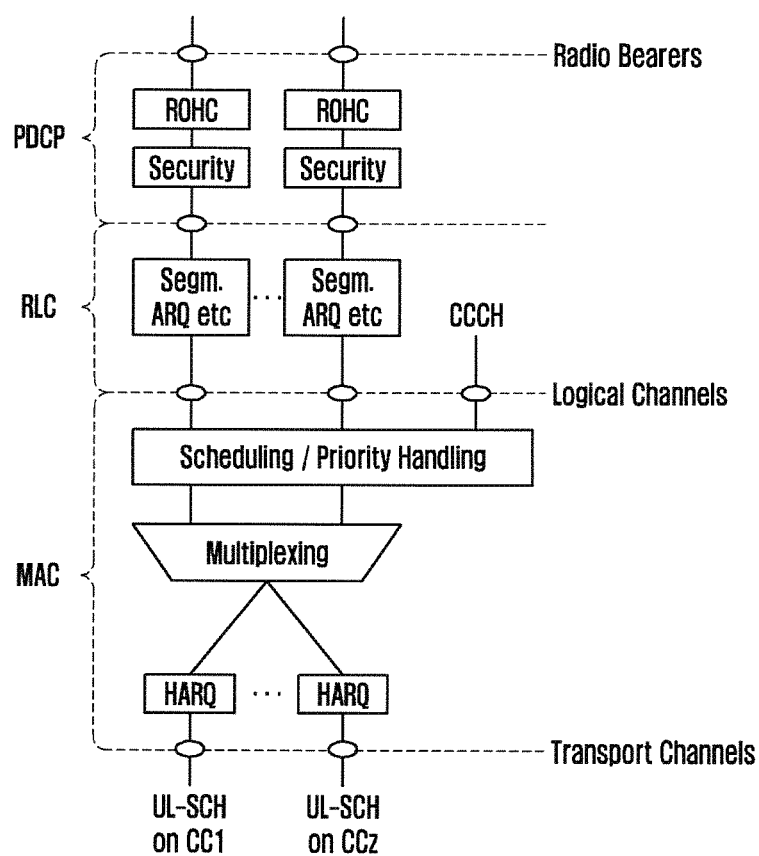
FIG. 2 is a conceptual diagram illustrating an L2 structure and function of the LTE/LTE-A UE.

FIG. 2 is a conceptual diagram illustrating an L2 structure and function of the LTE/LTE-A UE. The L2 layer may be divided into a Medium Access Control (MAC) sublayer, a Radio Link Control (RLC) sublayer, and a Packet Data Convergence Protocol (PDCP) sublayer. The Service Access Point (SAP) for peer-to-peer communication is an interface between sublayers as represented by a circle. The PDCP sublayer is responsible for compression/decompression of the IP Header of an Internet Protocol (IP) packet received from an upper layer using a Robust Header Compression (RoHC) protocol and for ciphering/deciphering and integrity check on the packet to be transmitted through the radio interface.

The RLC sublayer is responsible for concatenating a plurality of packets received from the PDCP sublayer in adaptation to the radio channel condition or segmenting a packet received from the PDCP sublayer into a plurality of packets in adaptation to the radio channel condition, the concatenated or segmented packet(s) being transferred to the MAC sublayer), or assembling the packets from the MAC sublayer, the assembled packet being delivered to the PDCP sublayer. Automatic Repeat Request-based retransmission (ARQ-based retransmission) is adopted for packet transmission/reception error correction.

The MAC sublayer is responsible for requesting scheduling of the packet data to be transmitted from the eNB and for multiplexing, when scheduling information is received, the packets received through one or more logical channels by Transport Block as a transmission unit on the radio interface according to the received scheduling information. Also, the MAC sublayer is responsible for demultiplexing the transport block into the packets on one or more logical channels in the reception mode. In the multiplexing mode, the MAC sublayer handles the packets in consideration of the priorities of the logical channels (Priority Handling). The Transport Block is transmitted through an uplink Shared Channel (UL-SCH) and, if necessary, may be retransmitted through a Hybrid ARQ (HARQ) function (it is possible to correct packet transmission/reception error at the MAC sublayer using the HARQ retransmission function). The L2 structure and function of the UE are specified in the 3GPP standard TS36.323 PDCP Specification, TS36.322 RLC Protocol Specification, and TS36.321 MAC Protocol Specification, and thus detailed description thereof is omitted herein.

Figure 3:
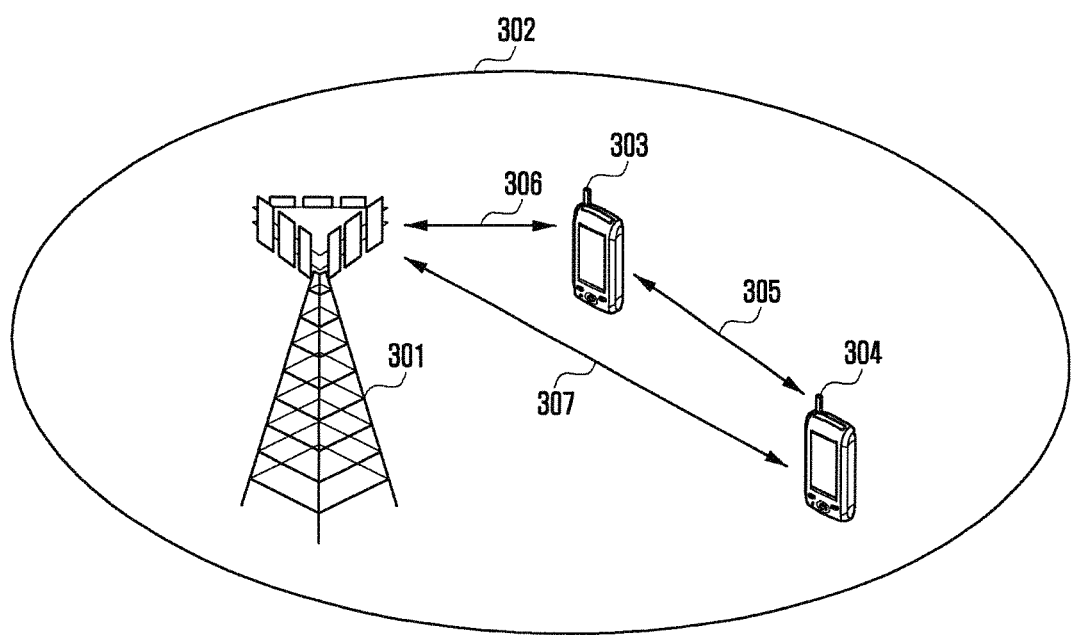
FIG. 3 is a diagram illustrating D2D communication in a cellular system.

FIG. 3 is a diagram illustrating D2D communication in a cellular system. Referring to FIG. 3, the eNB 301 serves the UEs 303 and 304 located within the cell 302. The UE 303 is capable of performing cellular communication through the eNB 301 and the UE-eNB link 306. Also, the terminal 304 is capable of performing cellular communication through the UE-eNB link 307. If both the UEs 303 and 304 support D2D communication, they can exchange information directly through the D2D link 305 without involvement of the eNB 301.

Figure 4:
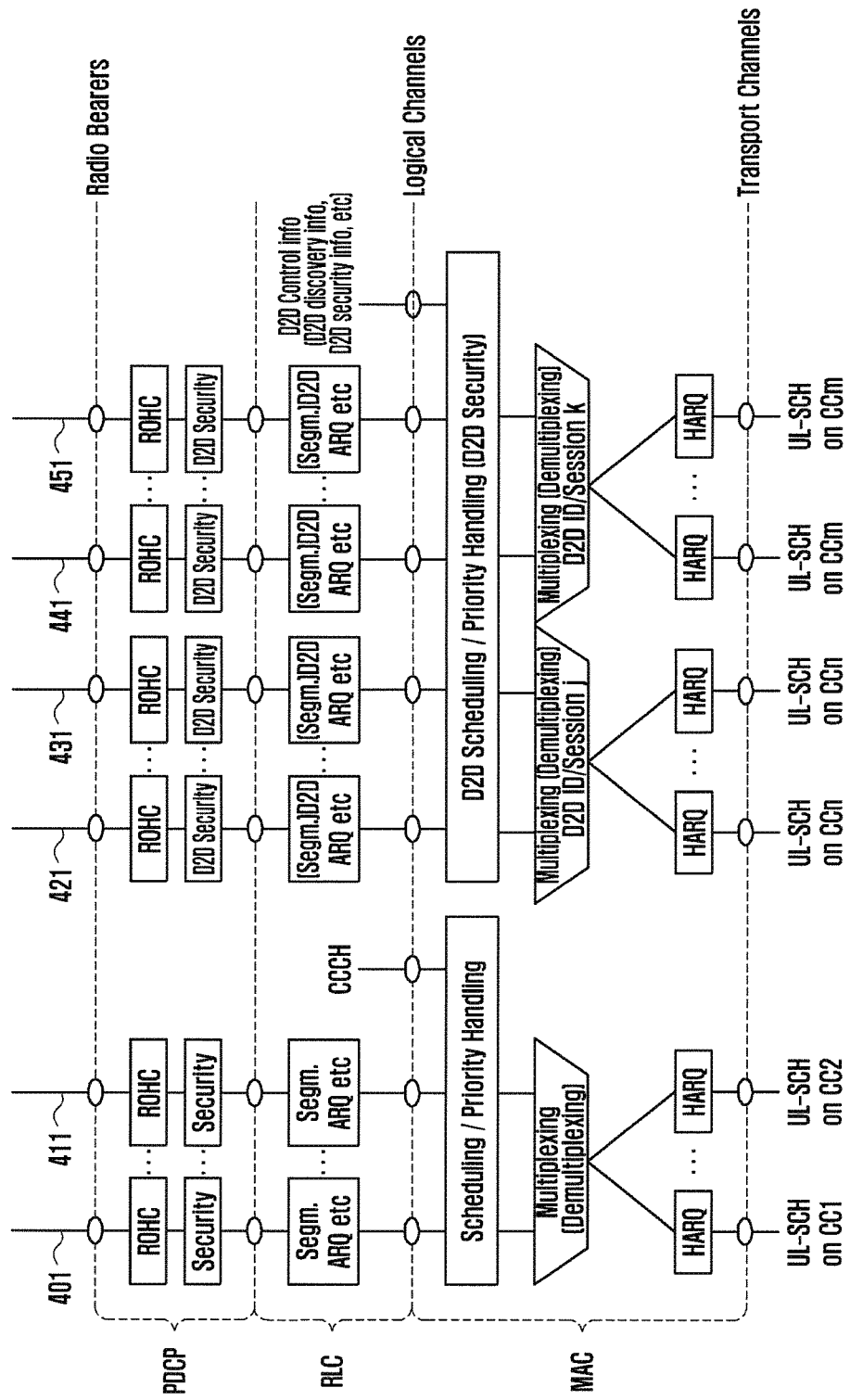
FIG. 4 is a conceptual diagram illustrating the L2 structure and function of D2D communication-enabled UE according to an embodiment of the present invention.

FIG. 4 is a conceptual diagram illustrating the L2 structure and function of D2D communication-enabled UE according to an embodiment of the present invention. Referring to FIG. 4, the communication system according to an embodiment of the present invention may include distinct L2 structures for the services/applications utilizing the 3GPP network and the services/applications utilizing the D2D links. In the embodiment of FIG. 4, the L2 entities and paths corresponding to the services/applications utilizing the 3GPP network are mapped as denoted by reference number 401 and 411, and the L2 entities and paths corresponding to the services/applications utilizing the D2D links are mapped as denoted by reference numbers 421, 431, 441, and 451. The L2 structure may further include a D2D control information-specific Access Point (AP) (D2D control info in FIG. 4). The D2D control information-specific AP is connected to the MAC layer to receive the D2D application control information from a D2D application sublayer.

According to an embodiment, the control information is the D2D discovery information including a D2D identifier (id)/D2D group id to announce or search and transmission start timing, transmission period, and number of transmissions of the D2D discovery message including the D2D id/D2D group id. The D2D control information-specific AP makes it possible for the UE supporting the D2D communication technology to receive the signal for Discovery of neighboring UEs (D2D-D) or the control information for use in controlling the D2D communication (D2D-C) from the D2D application layer directly.

In the case of the 3GPP network-based service/application data, the IP packet from the upper layer is transferred to the physical layer via the PDCP sublayer, RLC sublayer, and MAC sublayer so as to be transmitted through the UL-SCH as a physical channel; and the transport block received through the DL-SCH as a physical channel is delivered to the corresponding upper layer via the MAC sublayer, RLC sublayer, and PDCP sublayer in the form of an IP packet. The operations of the PDCP sublayer, RLC sublayer, and MAC sublayer on the paths 401 and 411 have been described with reference to FIG. 2.

Also, the D2D link-based service/application data can be transferred to the physical layer via the PDCP sublayer, RLC sublayer, and MAC sublayer and then transmitted through the D2D-dedicated physical channel (D2D-SCH). The PDCP sublayer may be optimized for D2D link communication so as to operate in a different manner from the legacy PDCP sublayer. For example, in the case of the D2D link-based service/application data, the ciphering/deciphering and integrity check function to be performed on the packet to be transmitted through the D2D link may be omitted or replaced by a new ciphering/deciphering and integrity check function. In the former case, the D2D security operation may be omitted in the PDCP sublayer in FIG. 4. It is also possible to use the 3GPP network-based service/application data ciphering/deciphering and integrity check function for the D2D link-based service/application data in such a way of using a key value different from that used for the 3GPP network-based service/application data ciphering/deciphering and integrity check functions. In the case where the D2D data ciphering/deciphering and integrity check functions are omitted in the D2D-dedicated PDCP sublayer, those functions may be performed on the upper layer (application layer) or a lower layer (e.g. MAC sublayer).

Also, the RLC sublayer may be optimized for the D2D link communication so as to operate in a different manner from the legacy RLC sublayer. For example, in the case of the D2D link-based service/application data, it may be possible to retransmit the data a number of times as configured by the network or specified in the standard unconditionally instead of using the ARQ. Also, the RLC level retransmission function may be excluded.

Also, the MAC sublayer may be optimized for the D2D link communication so as to operate in a different manner from the legacy MAC sublayer. If the D2D packet data come into being, the MAC sublayer may occupy the resource available for D2D link (the information on the D2D resource available for D2D link may be received through System Information broadcast within the cell or a UE-specific message from a D2D server) immediately or may request/announce the use of the D2D resource through a D2D-dedicated control channel.

The D2D link-based service/application data may be mapped to a specific radio bearer or logical channel (hereinafter, the radio bearer/logical channel mapped to the D2D link-based service/application data is referred to as D2D-dedicated radio bearer/logical channel). The specific radio bearer or logical channel may be configured by the network and informed to the UEs. According to an embodiment, an eNB or a D2D server may notify the UEs about the radio bearer ID or logical channel ID mapped to the D2D link-based service/application data using the D2D link. The specific radio bearer or logical channel may be identified by specific values as the dedicated radio bearer/logical channel id.

If the D2D-dedicated radio bearer or logical channel is mapped, the D2D link-based service/application data are transmitted only through the radio bearer or logical channel. The MAC sublayer does not multiplex the Tx D2D data received through the D2D-dedicated logical channel with the 3GPP network-based service/application data.

In the case of multiplexing to generate D2D link-based transport block, the MAC sublayer can multiplex only the Tx data received through D2D-dedicated logical channel(s). In the case of multiplexing to generate cellular network-based transport block, the MAC sublayer can multiplex only the Tx data received through the cellular network-dedicated logical channel(s). In the case of multiplexing the Tx D2D data received through the D2D-dedicated logical channel(s), it is possible to multiplex the Tx D2D data received through all D2D-dedicated logical channel(s).

According to another embodiment, the MAC sublayer may multiplex the D2D data of the same session of the D2D link among the Tx D2D data received through the D2D-dedicated logical channels (i.e. the D2D data of different D2D link sessions are not multiplexed). The D2D ID or D2D session ID may be an ID for identifying the a UE/user of the D2D communication, an ID for identifying a D2D service/application, an ID for identifying a specific D2D service/application, an ID for identifying common interest, or a group ID for identifying a communication group. According to an embodiment, the reference numbers 421, 431, 441, and 451 correspond to D2D-dedicated logical channels transferring D2D data to the MAC sublayer. Suppose that the D2D-dedicated logical channels corresponding to the reference numbers 421 and 431 carry the D2D data corresponding to the D2D ID j or D2D session ID j and the logical channels corresponding to the reference numbers 441 and 451 carry the D2D data corresponding to the D2D ID k or D2D session ID k. In this case, the Tx D2D packets received through the logical channels corresponding to the reference numbers 421 and 431 can be multiplexed with each other while the Tx D2D packets received through the logical channels corresponding to the reference numbers 441 and 451 can be multiplexed with each other.

There may be one or more multiplexing or demultiplexing entities. In the case where there is only one multiplexing entity, the multiplexing operation is performed by an ID or a session ID. In the case where there are multiple multiplexing entities, each multiplexing entity multiplexes the data having the same ID or the same session ID. The D2D packet multiplexing can be performed in consideration of the priorities of the logical channels. For example, when multiplexing the Tx D2D packets received through the logical channels corresponding to the reference numbers 421 and 431, if the priority of the logical channel corresponding to the reference number 421 is higher than the logical channel corresponding to the reference number 431, the MAC sublayer may multiplex the Tx data/packets received through logical channel corresponding to the reference number 421 into the corresponding transport block with priority or multiplex more/large data/packets into the corresponding transport block.

The generated transport block is transmitted through the D2D-dedicated physical channel (D2D_SCH). Unlike the 3GPP network-based data transmission, the HARQ-based retransmission may not be used (in this case, the HARQ entities may be omitted in the MAC sublayer), but the data may be retransmitted a number of times as configured by the network or specified in the standard unconditionally. Also, the RLC level retransmission function may be excluded. When D2D data are received through the D2D physical channel, the MAC sublayer may perform the demultiplexing operation.

Figure 5:
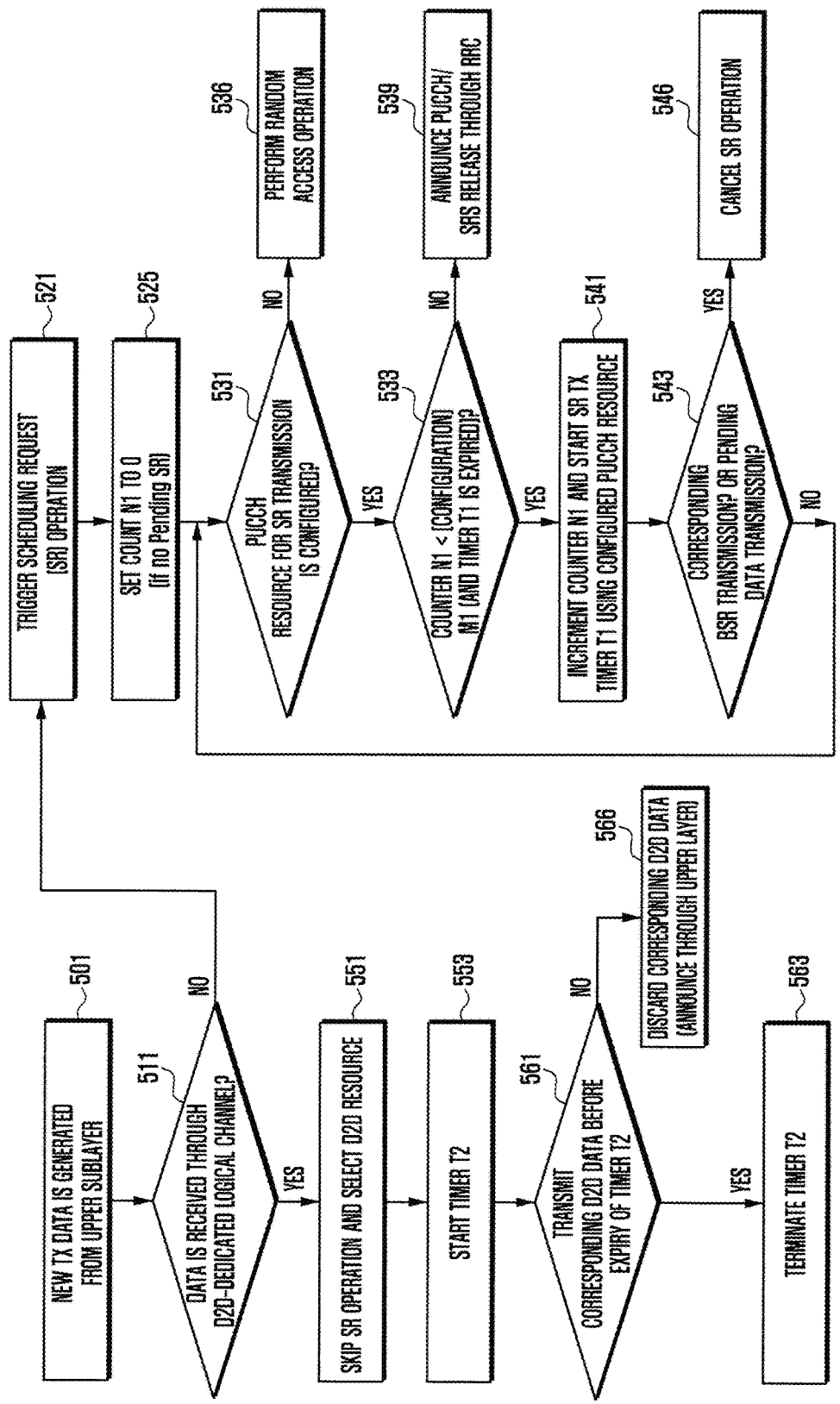
FIG. 5 is a flowchart illustrating a scheduling request operation of a D2D communication-enabled UE according to an embodiment of the present invention.

FIG. 5 is a flowchart illustrating a scheduling request operation of a D2D communication-enabled UE according to an embodiment of the present invention. Referring to FIG. 5, if new data to be transmitted is generated from a higher sublayer at step 501, a MAC entity may determine whether the data is received through a D2D-dedicated logical channel at step 511. Instead of determining whether the data is received through the D2D-dedicated logical channel, the MAC entity may buffer the new data received from the upper layer in a specific buffer. It is possible to use two types of buffers: one for buffering data received through the 3GPP network-dedicated logical channel(s) and the other for buffering data received through the D2D link-dedicated logical channel(s) and to check the buffer in which the data is present. If the Tx data are buffered in the buffer connected to the 3GPP network-oriented logical channel(s), the procedure goes to step 521 and, otherwise if the Tx data are buffered in the buffer connected to the D2D link-oriented logical channel(s), the procedure goes to step 551.

If the data from the upper sublayer is received through the 3GPP network-dedicated logical channel(s) but not the D2D-dedicated logical channel(s), the UE may trigger the Scheduling Request (SR) operation at step 521. If there is no pending SR triggered previously, the UE may set the Counter N1 to 0 at step 525. The UE may determine whether Physical Uplink Control Channel (PUCCH) resource for transmitting the SR is configured at step 531. This resource may be configured based on a UE-specific message or System Information.

If no PUCCH resource for transmitting the SR is configured, the UE initiates a Random Access Procedure through a Random Access Channel (RACH) at step 536. Otherwise if the PUCCH resource for transmitting the SR is configured, the UE determines whether the counter N1 is less than M1 configured by the network or fixed in the standard specification at step 533. At this time, if a Timer T1 is configured, the UE may determine whether the timer T1 has expired. If the counter N1 is less than M1 and if the timer T1 has expired, the UE may increment the counter N1, transmit the SR using the configured PUCCH resource, and starts the timer T1 at step 541. Otherwise if the counter N1 is not less than M1, the UE may notify the Radio Resource Control (RRC) sublayer of PUCCH/SRS (Sounding Reference Signal) release at step 539. The RRC sublayer is responsible for controlling radio resource and generating/processing RRC control messages.

If the counter N1 is less than M1 and if the timer T1 has not expired, the UE waits until the timer T1 expires and then performs the operation of step 541. If the UE is allocated resources from the eNB, after transmitting the SR, and if it transmits Buffer Status Report (BSR) MAC information or corresponding data completely at step 543, the UE cancels the SR operation and, otherwise if the conditions of step 543 are not fulfilled, the procedure returns to step 531.

If the data from the upper layer is received through the D2D-dedicated logical channel, the UE does not trigger the SR operation but D2D resource selection operation at step 551 and starts a timer T2 at step 553. The timer T2 may start before the D2D resource selection operation of step 551.

If the corresponding D2D data are transmitted before expiry of the timer T2 at step 561, the UE may stop the timer T2 at step 563. If it fails to transmit the corresponding D2D data through a D2D link before expiry of the timer T2, the UE may discard the corresponding D2D data at step 566. The result of step 566 may be reported to the upper layer.

In the D2D communication system, it is difficult to receive feedback corresponding to the transmission-failed signal because no configuration is provided by the eNB. Accordingly, in order to prevent the system from being complicated, it may be possible to discard the data which have not been transmitted successfully before expiry of the timer.

In FIG. 5, it is assumed that the transmission on D2D link is performed using the D2D resources which the UE has selected autonomously according to a specific rule without scheduling/resource allocation from a specific node. However, it is also possible for a specific D2D communication-enabled to schedule/allocate resources to another D2D UE for data transmission.

In the latter case, if the determination results in "Yes" at step 511, the UE may operate as follows instead of steps 551 to 566. Instead of triggering the legacy SR operation, it may be possible to trigger transmission of a D2D control channel-based SR message (hereinafter, referred to as D2D-SR). If there is no pending D2D-SR triggered previously, it may be possible to set a separate counter N2 to 0. If the counter N2 is less than a value M2 configured by the network (or specified in the standard) and if the timer T2 has expired, it may be possible to increment the counter N2, transmit the D2D-SR through a D2D control channel of the D2D link, and start the timer T2. If the counter N2 is not less than the value M2, it may be possible to notify the RRC sublayer of D2D-SR transmission failure instead of the PUCCH/SRS release. It may be possible to discard the corresponding D2D data.

If the counter N2 is less than M2 and if the timer T2 has not expired, it may be possible to wait until the timer T2 expires and, if the timer T2 expires, then increment the counter N2, transmit the D2D-SR through the D2D control channel of the D2D link, and starts the timer T2. The counter N2, timer T2, and M2 are parameters configured for the purpose of D2D communication and set to values different from those of the counter N1, timer T1, and M1 related to the legacy SR transmission. The UE of the timer T2 is optional, and it may be possible to compare N2 values without use of the timer T2

After transmitting the D2D-SR through the D2D control channel of the D2D link, the UE may be allocated D2D resources from a specific D2D UE responsible for scheduling. If the UE transmits the D2D Buffer Status Report (D2D-BSR) for reporting D2D data amount or D2D data, the D2D-SR transmission may be canceled.

In FIG. 5, it is also assumed that the transmission on D2D link is performed in such a way that the UE selects certain D2D resources autonomously according to a specific rule among the D2D resources informed by the D2D server or the system information and transmits the corresponding data using the selected resources. It may be possible to consider a method for the UE to select certain D2D resources autonomously according to a predetermined rule, after the receipt of Allowance for use of D2D resources from the network, and transmit the corresponding data using the selected resources.

In the case of applying this method, although the Tx data is received through the D2D-dedicated logical channel at step 511, it may be possible to perform steps 521 to 546. After step 511, if the UE is in the RRC connected state and has a serving cell, it may be possible to perform steps 521 to 566. If the UE has no serving cell (or out of the 3GPP network coverage), it may be possible to perform steps 551 to 566.

If the UE has a serving cell and operates in the RRC idle state, it may be possible to establish an RRC connection with the eNB of the serving cell and perform steps 521 to 546. The RRC connected state is the state in which an RRC connection is established between the UE and the eNB controlling the serving cell and thus the eNB has the information on the UE. The RRC idle state is the state in which no RRC connection is established between the UE and the eNB controlling the serving cell and thus the eNB has not information on the UE. See the 3GPP standard TS36.331 RRC Protocol Specification for more detailed information on the RRC connected state and RRC idle state.

In the above case, when performing steps 521 to 546, it may be possible for procedure goes from step 543 to step 546 or step 531 depending on whether a D2D-BSR for reporting the Tx data amount received through the D2D-dedicated logical channel(s) or a D2D-combined BSR for reporting the Tx data amount received through the 3GPP network-dedicated logical channel(s) and the Tx data amount received through the D2D-dedicated logical channel(s) together, instead of the operations depicted in FIG. 5.

That is, if the D2D-BSR or D2D-combined BSR is transmitted at step 543, the procedure goes to step 546. Otherwise if the D2D-BSR or D2D-Combined BSR is not transmitted, the procedure goes to step 531. The UE may transmit the D2D-BSR or D2D-combined BSR and, if the allowance for use of the D2D resources is received form the corresponding eNB, perform step 551 to 566.

The eNB may send the UE the allowance using a UE-specific message of the RRC sublayer or a UE-specific Control Element (CE) of the MAC sublayer. In the latter case, the MAC header includes a MAC sub-header including a logical channel ID reserved for use of indicating the presence of the UE-specific MAC CE field and thus it is possible to inform the UE that the use of D2D resources is allowed using the MAC CE filed indicated by the logical channel ID. It may also be possible to use the MAC sub-header including a specific logical channel ID reserved for the purpose of indicating the allowance for use of the D2D resources without extra MAC CE field. In this case, if the MAC sub-header including the logical channel ID is transmitted, this means that the use of the D2D resources is allowed.

Figure 6:
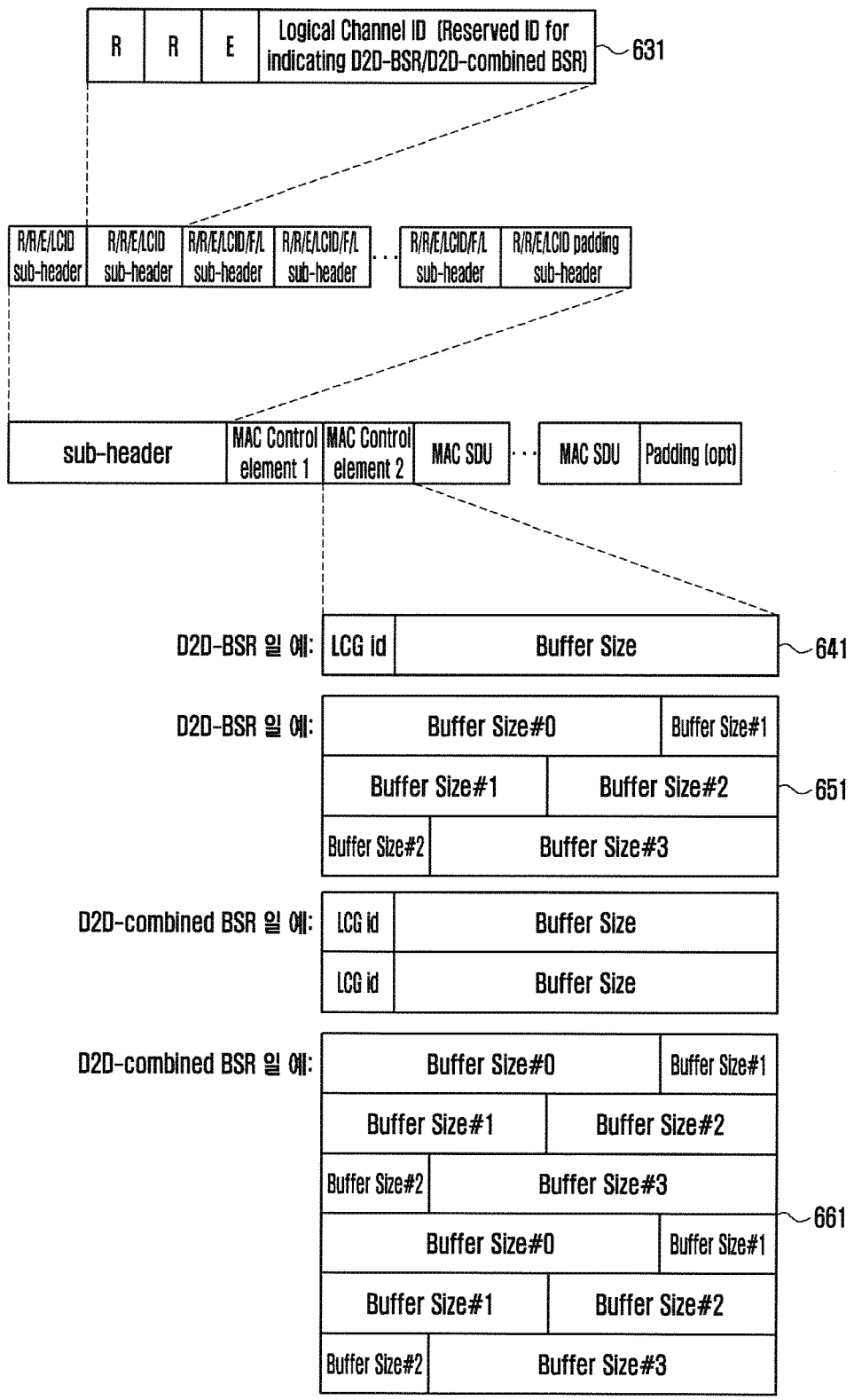
FIG. 6 is a diagram illustrating a format of the D2D-BSR/D2D-combined BSR according to an embodiment of the present invention.

FIG. 6 is a diagram illustrating a format of the D2D-BSR/D2D-combined BSR according to an embodiment of the present invention. A MAC Protocol Data Unit (PDU) includes a MAC Header and a MAC Payload. The MAC Header may include a plurality of MAC sub-headers. A MAC sub-header may have a format of R/R/E/LCID/F/L or R/R/E/LCID. One MAC sub-header may be mapped to one MAC Service Data Unit (SDU), MAC CE, padding to inform of the presence/absence of corresponding MAC SDU/MAC CE/Padding and the format.

'R' denotes the bits which have no information but reserved for use of transmitting the information to be defined in the future.

'E' denotes a bit indicating whether a MAC sub-header follows. For example, the field 'E' may be set to 1 to indicate the presence of a MAC sub-header following the current MAC sub-header or 0 to indicate that there is no MAC sub-header following the current MAC sub-header but presence of the MAC SDU, MAC CE, or padding.

The LCID is the logical channel ID to indicate the logical channel through which the MAC SDU corresponding to the MAC sub-header is received, the type of the MAC CE field, or the type of the padding. 'F' is the information indicating a size of the 'L' field, and 'L' indicates the size/length of the MAC SDU or MAC CE field corresponding to the MAC sub-header.

In FIG. 6, the D2D-BSR/D2D-combined BSR is carried in the MAC CE 621 and the MAC sub-header 601 is used to indicate the presence of the MAC CE 621. The detailed information on the MAC sub-header is contained in a part 611. The part 611 may include two 'R' bits, one 'E' bit, and a 5-bit Logical Channel ID. The bit sizes are examples but may be changed without being limited to the embodiment of FIG. 6.

The logical channel ID may be a specific logical channel ID value specified in the standard for the purpose of indicating the D2D-BSR or D2D-combined BSR MAC CE. If the logical channel ID is included, this means that the D2D-BSR or D2D-combined BSR MAC CE 621 follows the MAC sub-header.

Instead of using the specific logical channel ID value specified in the standard for the purpose of indicating the D2D-BSR or D2D-combined BSR MAC CE, it may also be possible to use the 'R' bits in the MAC sub-header. In this case, the logical channel ID may include the logical channel ID indicating the BSR MAC CE for reporting the data amount on the 3GPP network-dedicated logical channel(s). This means that one of the logical channel ID of "11101", "11110", and "11111" indicating the BSR MAC CE that are specified in the current 3GPP standard TS36.321 MAC Protocol Specification can be used without defining and extra logical channel ID indicating the D2D-BSR or D2D-combined BSR MAC CE. Instead, the 'R' bits may be used to indicate whether the BSR is the D2D-BSR/D2D-combined BSR MAC CE or the BSR MAC CE for reporting the data amount of the 3GPP network-dedicated logical channel(s).

In an exemplary case of using an 'R' bit, if the 'R' bit is set to 1 and if the logical channel ID indicating the BSR MAC CE is included, the corresponding UE-specific control information (MAC CE) may be the D2D-BSR or D2D-combined BSR MAC CE. If the 'R' bit is set to 0 and if the logical channel ID indicating the BSR MAC CE is included, the corresponding UE-specific control information (MAC CE) may be the BSR MAC CE o of the 3GPP network-dedicated logical channel(s). The values of '1' and '0' of the R bit may be interpreted oppositely.

In order to distinguish between the D2D-BSR/D2D-combined BSR MAC CE and the BSR MAC CE for reporting the data amount of the 3GPP network-dedicated logical channel(s), both the two 'R' bits may be used. For example, if the two 'R' bits are set to '00' and if the logical channel ID indicating the BSR MAC CE is included, this indicates the BSR MAC CE of the 3GPP network-dedicated logical channel(s); and if the two 'R' bits are set to '10' and the logical channel ID indicating the BSR MAC CE is included, this indicates the D2D-combined BSR MAC CE. The values of the two 'R' bits are examples and may be defined with different values.

The logical channel ID "11100" may be used for transmitting a truncated BSR MAC CE, "11101" for transmitting a short BSR MAC CE, and "11110" for transmitting a long BSR MAC CE. The short BSR may be used for reporting the data amount of the Tx data received through the logical channels of one of a plurality of logical channel groups and may include the corresponding Logical Channel Group (LCG) ID and the corresponding buffer size. The long BSR may be used for reporting the data amount of the Tx data received through the logical channels of the plural logical channel groups and may include a plurality of buffer sizes. In this case, the buffer sizes are mapped to the corresponding logical channel groups. The truncated BSR is used to report the data amount of the logical channel group with the highest priority among the plural logical channel groups in which data come into being, due to the radio resource constraint, although there are Tx data received through the logical channels of the plural logical channel groups. It may also be possible to report the ID and buffer size of the logical channel group having the highest priority.

The logical channel group is formed by grouping a plurality of logical channels with similar priorities for BSR, and the per-logical channel configuration information (e.g. logical channel group ID per logical channel) is informed by the network.

Reference numbers 631 and 641 denote exemplary D2D-BSR MAC CEs. In the example as denoted by reference number 631, the LCG id is the id of the logical channel group including the D2D-dedicated logical channel through which the Tx data is generated/received. The buffer size indicates the data amount of the logical channel group. The data amount may be signaled in the form of an absolute value or an index value referencing the absolute value.

In the example as denoted by reference number 641, the data amounts of the 4 logical channels groups are reported respectively. The Buffer Size #0 indicates the Tx data amount of LCG id #0, the Buffer Size #1 indicates the Tx data amount of LCG id #1, the buffer Size #2 indicates the Tx data amount of LCG #2, and the Buffer Size #3 indicates the Tx data amount of LCG id #3. Reference numbers 651 and 661 denote exemplary D2D-combined BSR MAC CEs. In the D2D-combined BSR MAC CE 651, the LCG id at the upper part is the id of the logical channel group of the 3GPP network-dedicated logical channel(s) through which the Tx data are generated/received. The LCG id at the lower part is the id of the logical channel group of the D2D-dedicated logical channel(s) through which the Tx data are generated/received. The Buffer Size indicate the data amount of the logical channel group.

In the D2D-combined BSR MAC CE 661, the Buffer Size #0, Buffer Size #1, Buffer Size #2, and Buffer Size #3 at the upper part indicate the Tx data amounts corresponding to the logical channel group #0, logical channel group #1, logical channel group #2, and logical channel group #3 of the 3GPP network-dedicated logical channels, respectively. The Buffer Size #0, Buffer Size #1, Buffer Size #2, and Buffer Size #3 at the lower part indicate the Tx data amounts corresponding to the logical channel group #0, logical channel group #1, logical channel group #2, and logical channel group #3 of the D2D link-dedicated logical channels, respectively.

Figure 7A:
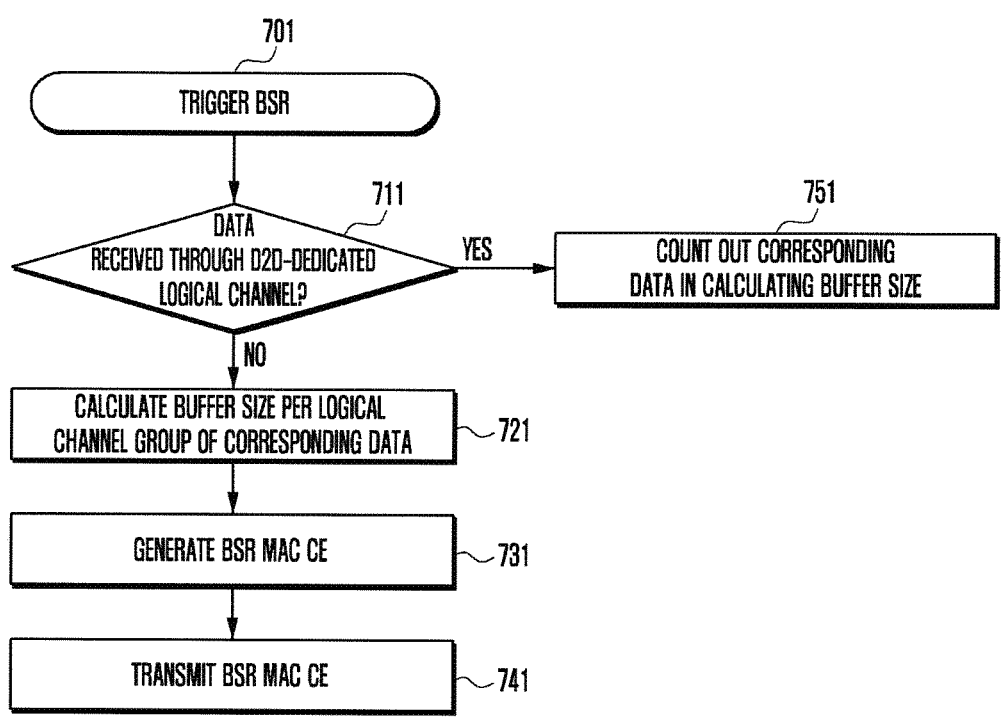
FIGS. 7A & 7B show flowcharts illustrating buffer status report operations of the UE supporting D2D-communication according to an embodiment of the present invention.
Figure 7B:
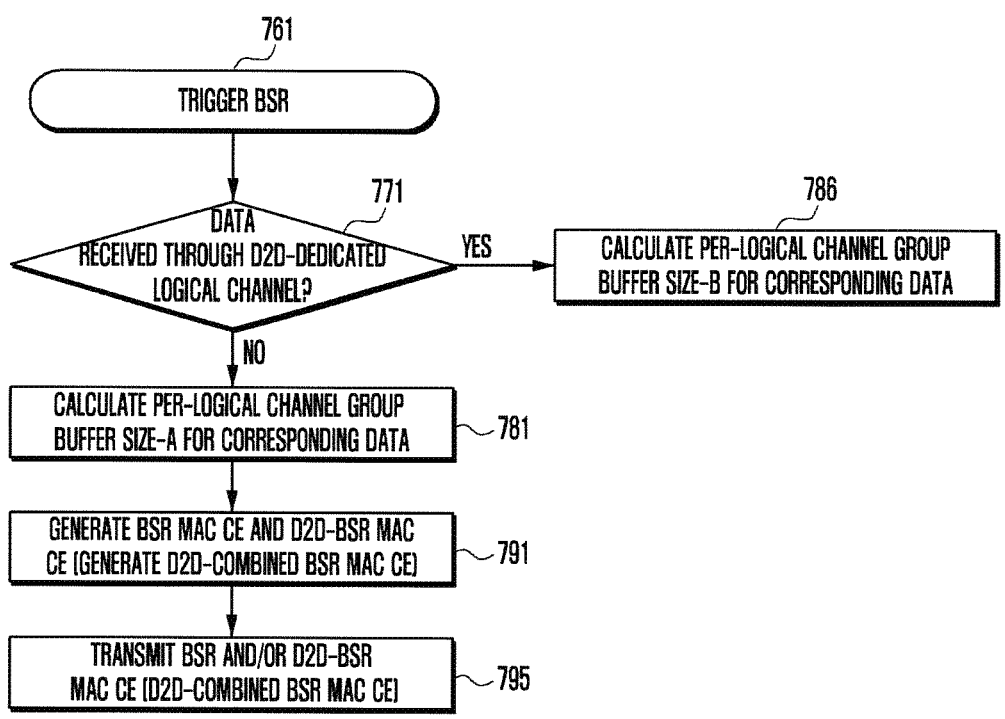

FIGS. 7A&7B show flowcharts illustrating buffer status report operations of the UE supporting D2D-communication according to an embodiment of the present invention. Referring to FIG. 7A, if BSR is triggered at step 701, the UE distinguishes between the Tx data received, among the data generated from the upper sub-layer, through the D2D-diedicated logical channel(s) and the 3GPP network-dedicated logical channel(s) at step 711.

The UE counts out the Tx data received through the D2D-dedicated logical channel(s) in calculating the buffer size at step 751 and counts in only the data received through the 3GPP network-dedicated logical channel(s) to calculate the buffer size per logical channel group at step 721. At step 731, the UE generates the BSR MAC CE using the per-logical channel group buffer sizes calculated at step 721 and transmits the BSR MAC CE at step 741 using the resource allocated by the network.

Steps 701 to 741 correspond to a method of counting out the Tx data received through the D2D-dedicated logical channel(s) in the buffer size information.

In another embodiment of FIG. 7B, the buffer size for the Tx data received through the D2D-dedicated logical channel(s) may be calculated separately through steps 761 to 795. The BSR may be triggered at step 761. The BSR may be triggered to report the buffer status associated with the Tx data received through the D2D-dedicated logical channel(s) and the buffer status associated with the Tx data received through the 3GPP network-dedicated logical channel(s). For example, the BSR trigger condition for the data received through the 3GPP network-dedicated logical channel(s) may be applied as the BSR trigger condition for the data received through the D2D-dedicated logical channel(s).

If the BSR is triggered at step 761, the UE distinguishes between the Tx data received, among the data generated from the upper sub-layer, through the D2D-diedicated logical channel(s) and the 3GPP network-dedicated logical channel(s) at step 771. The UE calculates per-logical channel group buffer size information-A using the Tx data received through the 3GPP network-dedicated logical channel(s) at step 781 and per-logical channel group buffer size information-B using the Tx data received through the D2D-dedicated logical channel(s) at step 786.

At step 791, the UE generates a BSR MAC CE using the per-logical channel group buffer sizes calculated at step 781 and a D2D-BSR MAC CE using the per-logical channel group buffer sizes calculated at step 786. The D2D-BSR MAC CE may include the group id information and the corresponding buffer size information. The group id information may include at least one of a peer UE/user id of the D2D communication, a D2D service/application id, an id indicating common interest, a group id for group communication, and a broadcast indication id. The UE may generate the D2D-combined BSR MAC CE using the per-logical channel group buffer sizes calculated at steps 781 and 786. The D2D-combined BSR MAC CE may include the information on both the Tx data amounts received through the 3GPP network-dedicated logical channel(s) and the D2D-dedicated logical channel(s).

At step 795, the UE may transmit the MAC CE generated at step 791 using the resource allocated by the network. In the case that both the BSR MAC CE and D2D-BSR MAC CE exist, the two UE-specific control informations (MAC CEs) may be transmitted simultaneously or selectively. For example, if the radio resource allocated by the network is not enough to transmit the existing BSR MAC CE and D2D-BSR MAC CE simultaneously, the UE may select one of the two MAC CEs according to a predetermined rule as follows and transmit the selected MAC CE with priority.

- Embodiment 1: The BSR MAC CE is selected and transmitted with priority.
- Embodiment 2: The D2D-BSR MAC CE is selected and transmitted with priority.
- Embodiment 3: The MAC CE including the logical channel group id with the highest priority is selected among the logical channel groups in which Tx data exist between the BSR MAC CE and D2D-BSR MAC CE. The id of the logical channel group with the highest priority may be mapped to the order of the logical group id. For example, the logical channel group with a low logical channel group id may be selected with priority. In an embodiment, assuming four logical channel groups 0, 1, 2, and 3; it may be possible to configure such that the logical channel group 0 has the highest priority, the logical channel group 1 has the next highest priority, the logical channel group 2, has the second lowest priority, and the logical channel group 3 has the lowest priority. Oppositely, it may also be possible to select the logical channel group with the highest logical channel group id with priority. In an embodiment, assuming four logical channel groups 0, 1, 2, and 3; it may be possible to configure such that the logical channel group 3 has the highest priority, the logical channel group 2 has the next highest priority, the logical channel group 1, has the second lowest priority, and the logical channel group 0 has the lowest priority. If the ids of the logical channel groups with the highest priorities among the logical channel groups having the Tx data that are included in the BSR MAC CE and D2D-BSR MAC CE are identical with each other, it may be possible to apply the rule of embodiment 1 or embodiment 2 or depend on the implementation of the UE.

Figure 8:
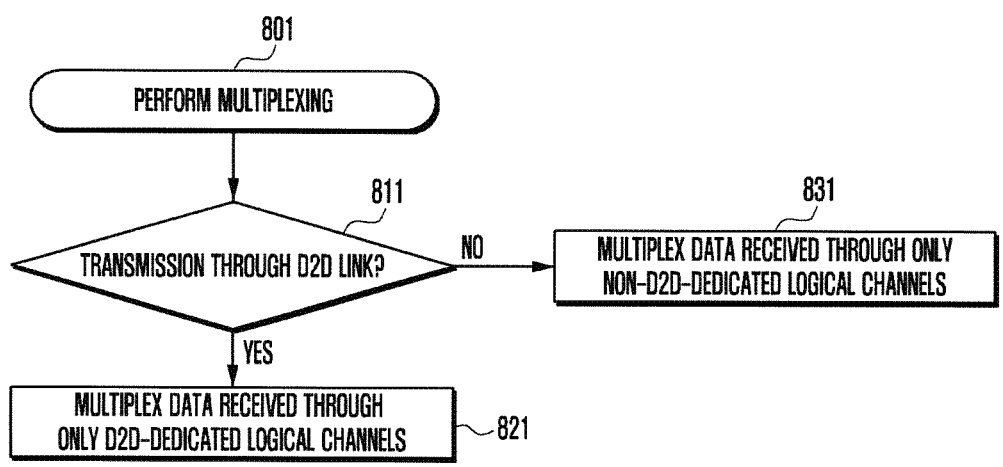
FIG. 8 is a flowchart illustrating a multiplexing operation of the UE supporting D2D-communication according to an embodiment of the present invention.

FIG. 8 is a flowchart illustrating a multiplexing operation of the UE supporting D2D-communication according to an embodiment of the present invention. If the multiplexing operation is initiated on the MAC sublayer at step 801, the UE determines whether the corresponding transport block is to be transmitted through the D2D link at step 811. The multiplexing is the operation of processing the Tx packets received through a plurality of logical channels to generate a transport block as transmission unit so as to be fit for the allocated/selected radio resources.

If the transport block is supposed to be transmitted through the D2D link, the UE multiplexes the Tx data/packets received through the D2D-dedicated logical channel(s) at step 821. Otherwise if the transport block is supposed to be transmitted through the 3GPP network other than the D2D link, the UE multiplexes the Tx data/packets received through the 3GPP network-dedicated logical channels at step 831. It may be possible to multiplex the logical channels in consideration of the priorities of the logical channels such that the Tx data/packets received through the high priority logical channel are included in the transport block with priority or more Tx data/packets receives through the high priority logical channel are included in the transport block.

In another embodiment, it may be possible to multiplex the data/packets (although they are received through the D2D-dedicated logical channels) belonging to the same session of the D2D link. The session of the D2D link may be identified by a D2D id or a D2D session id. The D2D id or D2D session id may be the id for use in identifying the peer UE/user of the D2D communication. That is, the session id may be used to identify the target UE to which the data/packets are addressed or the destination of the data/packets. The session id also may be a D2D service/application id, an identifier of a common interest, or a group ide for identifying a specific group established for group communication.

Figure 9A:
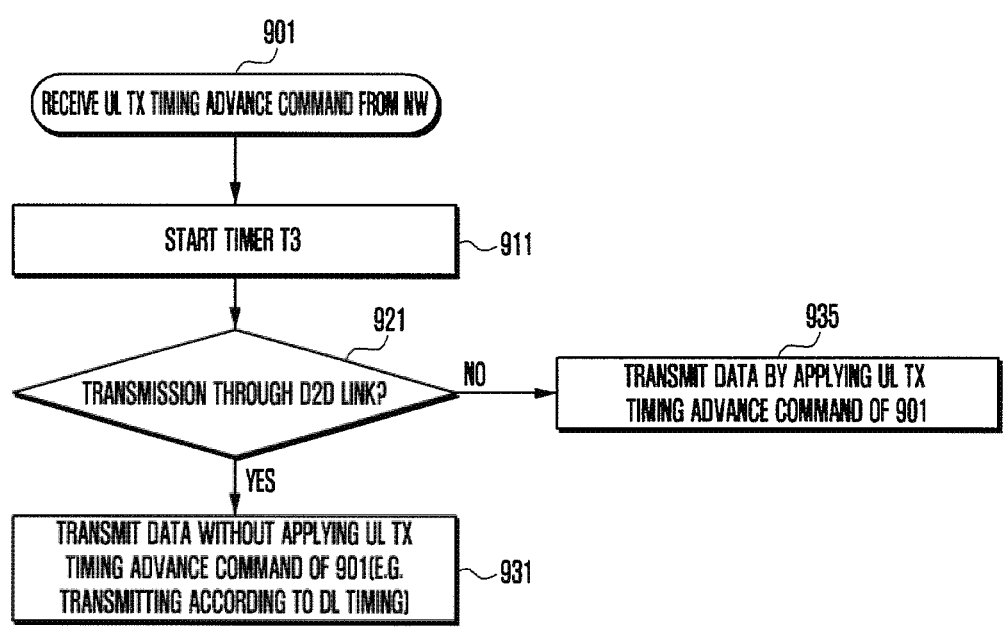
FIGS. 9A & 9B show flowcharts illustrating uplink timing management operations of the UE supporting D2D communication according to an embodiment of the present invention.
Figure 9B:
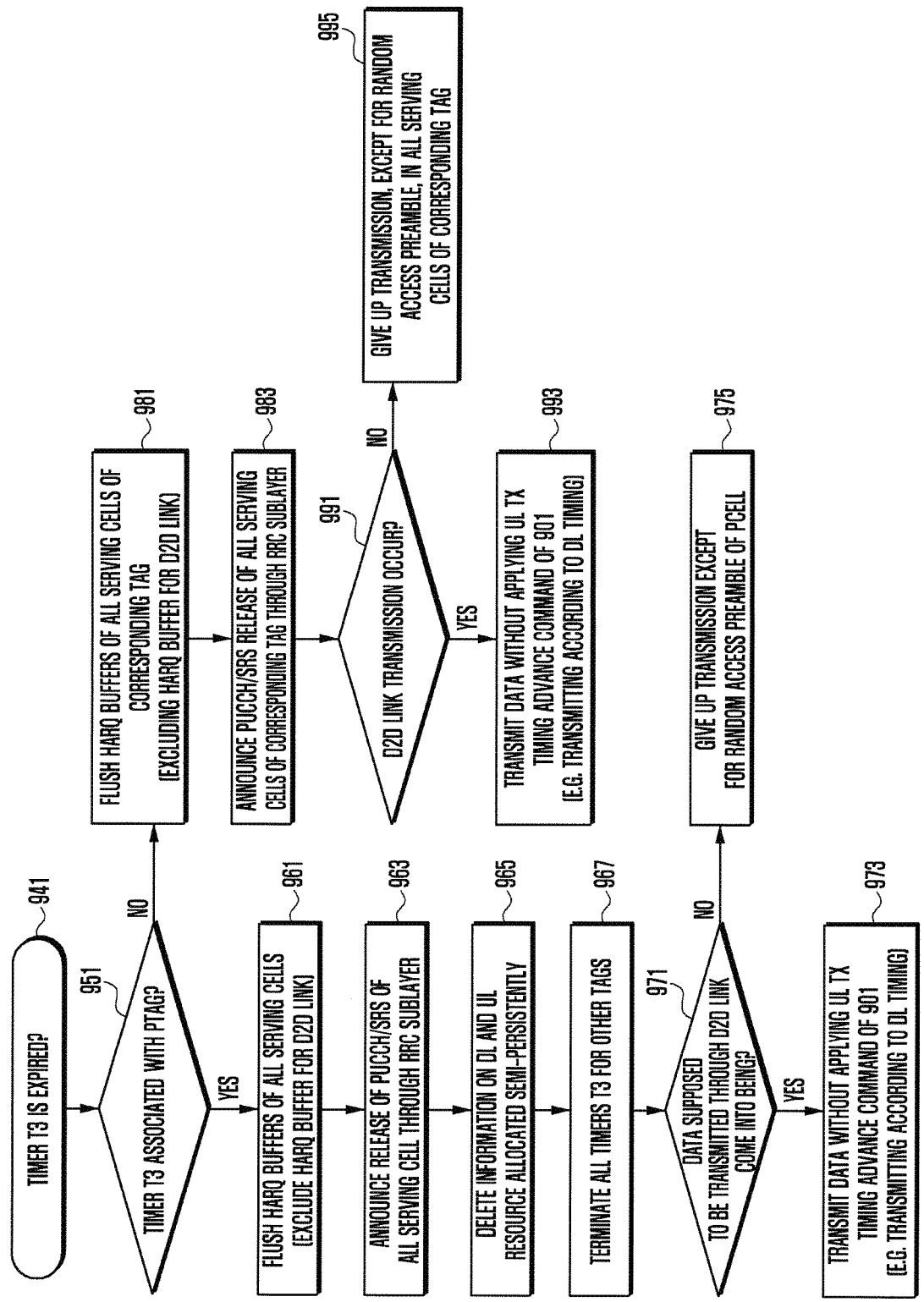

FIGS. 9A&9B show flowcharts illustrating uplink timing management operations of the UE supporting D2D communication according to an embodiment of the present invention. Referring to FIG. 9A, if a UL transmission Timing Advance Command is received from the network at step 901, the UE starts a timer T3 at step 911.

The timer T3 is used to determine validity of the received UL Timing Advance Command. It is assumed that the UL Timing Advance Command becomes invalid when the timer expires. The UL Timing Advance command is carried in a UL Transmission Timing (Advance) Command (Timing Advance Command) UE-specific Control information (MAC CE) or a Random Access Response MAC PDU transmitted in response to the Random Access Preamble transmitted through the RACH.

Afterward, if data to be transmitted comes into being, the UE determines whether the data is supposed to be transmitted through the D2D link at step 921 and, if so, transmits the data through the D2D link at step 931 without applying the UL timing advance command received at step 901. In an embodiment, the data may be transmitted at a Radio Frame Boundary. In the case of the data supposed to be transmitted through the 3GPP network, it may be possible to transmit the data at step 935 at the timing adjusted by applying the UL Timing Advance Command received at step 901.

A description is made of another embodiment with reference to FIG. 9B hereinafter. If the timer T3 expires at step 941, the UE determines whether the T3 timer is associated with the serving cells of a Primary Timing Advance Group (pTAG) at step 951. The time T3 is running per TAG.

The serving cell acting as a mobility and security anchor is referred to as PCell and other serving cells as SCells; and the TAG including the PCell is the pTAG, and the TAG including no PCell is referred to as Secondary TAG (sTAG).

If the timer T3 expired at step 941 is the timer T3 associated with the pTAG, the UE flushes the HARQ buffer for transmission through the 3GPP network at step 961. The UE announces the release of PUCCH/SRS of all serving cells through the RRC sub-layer signaling at step 963, delete the information on the DL and UL resources allocated semi-persistently at step 965, and terminates all of the T3 timers associated with other sTAGs at step 967. Afterward, if data to be transmitted comes into being, the UE determines whether the data is supposed to be transmitted through the D2D link at step 971.

If the data is supposed to be transmitted through the D2D link, the UE transmits the data at step 973 without applying the UL timing advance command received at step 901 regardless of the expired T3 timer. In an embodiment, the data may be transmitted at a DL radio frame boundary.

If the data is supposed to be transmitted through the 3GPP network other than the D2D link, the UE gives up transmitting the data and performs the random access procedure through the RACH of the PCell and transmits the data at the transmission timing adjusted by applying the UL timing advance command received from the network at step 975. The UL transmission timing command may be carried in the Random Access Response transmitted by the network in response to the Random Access Preamble transmitted by the UE.

If the timer TA expired at step 941 is not associated with the pTAG but a sTAG, the UE flushes the HARQ buffers of all serving cells of the sTAG among the HARQ buffers for the transmission through the 3GPP network, with the exception of the HARQ buffers for transmission through the D2D link, at step 981 and announces the release of PUCCH/SRS of all serving cells belonging the sTAG through RRC sub-layer signaling at step 983. Afterward, if data to be transmitted comes into being, the UE determines whether the data is supposed to be transmitted through the D2D link at step 991.

If the data are supposed to be transmitted through the D2D link, the UE transmits the data at step 993 without applying the UL timing advance command received at step 901 regardless of the expired T3 timer. In an embodiment, the data may be transmitted at the DL radio frame boundary. If the data is supposed to be transmitted through the 3GPP network other than the D2D link, the UE gives up transmitting the data through any serving cell belonging to the TAG at step 995. The UE may perform the random access procedure through the RACH of a serving cell of the TAG and transmit the data at the transmission timing adjusted by applying the UL timing advance command received from the network. The random access procedure in the serving cell of the sTAG cannot be initiated be the UE and thus it is necessary for the UE to receive a random access procedure execution command from the network.

Even in the case of transmitting data through the D2D link, if the UL timing advance is applied, it may be possible for the eNB to inform the UE of the corresponding pTAG/sTAG information. By assigning a TAG id to the D2D link, the transmission timing can be adjusted with the UL timing advance information corresponding to the pTAG/sTAG identified by the TAG id.

In this case, if the T3 timer of the TAG expires, the UE flushes the HARQ buffers for transmission through the D2D link together and gives up transmitting the D2D data being generated after the expiry of the T3 timer. In this case (in the case where data supposed to be transmitted through the D2D link comes into being after the expiry of the T3 timer of the pTAG/sTAG mapped to the D2D link), if the TAG mapped to the D2D link is the pTAG, the UE may perform random access in the PCell to receive the UL timing advance information and then transmit the data through the D2D link at the transmission timing adjusted by applying the UL timing advance information. The UL timing advance information may be carried in the Random Access Response transmitted by the network in response to the Random Access Preamble transmitted by the UE.

If the TAG mapped to the D2D link is a sTAG, the UE initiates the random access procedure to receive the UL timing advance information from the network and then transmits the data through the D2D link at transmission timing adjusted by applying the UL timing advance information. If the UE cannot initiate the random access procedure in a serving cell of the sTAG, it my send the eNB a message/information requesting the random access procedure execution command for random access procedure in a serving cell belonging to the sTAG mapped to the D2D link for D2D transmission. This information may be transmitted in the form of an explicit indicator or message or carried in the D2D-BSR or D2D-combined BSR.

If the request is received from the UE, the network may send the UE to a message commanding the random access procedure in the serving cell of the sTAG through Physical Downlink Control Channel (PDCCH). The UE performs the random access procedure as commanded to receive the UL timing advance information in the random access response message and then transmits the data through the D2D link at the transmission timing adjusted by applying the UL timing advance information.

Figure 10:
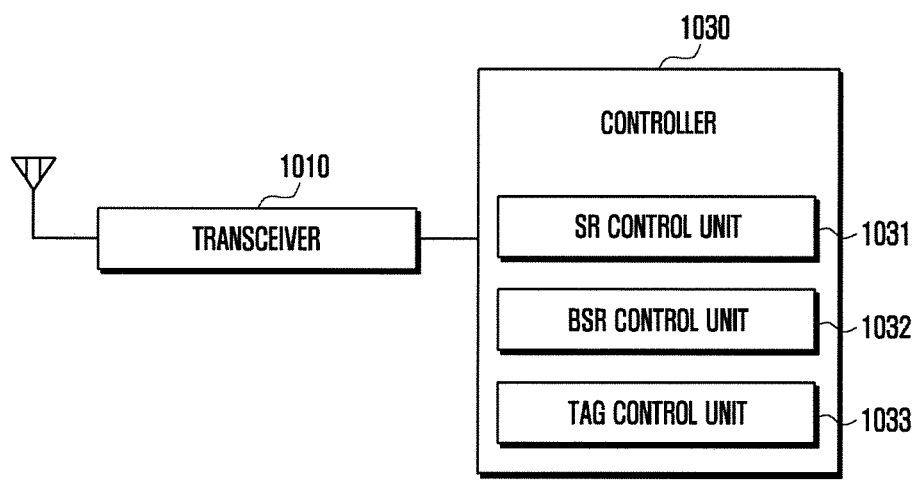
FIG. 10 is a block diagram illustrating a configuration of the UE supporting D2D communication according to an embodiment of the present invention.

FIG. 10 is a block diagram illustrating a configuration of the UE supporting D2D communication according to an embodiment of the present invention.

Referring to FIG. 10, the UE according to an embodiment of the present invention includes a transceiver 101 and a controller 1030.

The transceiver 101 may include one or more communication modules for radio communications. The transceiver 1010 may transmit/receive cellular data/signals to/from an eNB and/or D2D data/signals to/from other UEs in a D2D communication mode.

The control unit 1030 may control overall operations of the UE. Particularly, the controller 1030 may include a Scheduling Request (SR) control unit 1031, a Buffer Status Report (BSR) control unit 1032, and a Timing Advance Command (TAG) control unit 1033.

The SR control unit 1030 controls receiving Tx data from an upper sublayer, determining whether the data is received through a D2D-dedicated logical channel, skipping, when the data is received through the D2D-dedicated logical channel, the scheduling request operation, selecting D2D resources for transmitting the data, and transmitting the data using the selected D2D resources.

The SR control unit 1301 may also control starting a predetermined timer, discarding, when failing transmission of the D2D data before expiry of the timer, the D2D data, and reporting the transmission failure to the upper layer.

The SR control unit 1031 may also control transmitting, when it is determined that the data is not received through the D2D-dedicated logical channel, a scheduling request message for transmitting the upper layer data to the eNB.

The BSR control unit 1032 may control receiving data from the upper sub-layer, determining, when the BSR is triggered, whether there is any data received through a D2D-dedicated logical channel among the data, counting out the data received through the D2D-dedicated logical channel in calculating the buffer size according to the determination result, counting in the data received through non-D2D-dedicated logical channels in calculating buffer size per logical channel group, and transmitting a message including the buffer status report generated based on the calculated buffer size.

The BSR control unit 1032 may also control calculating the buffer sizes for the data received through the D2D-dedicated logical channels and the non-D2D-dedicated logical channels respectively among the received data and transmitting the D2D-dedicated buffer status report MAC control information (D2D BSR MAC CE) generated based on the buffer size calculated for the data received through the D2D-dedicated logical channels and the D2D BSR MAC CE generated based on the buffer size calculated for the data received through non-D2D-dedicated logical channels.

The TAG control unit 1033 may control receiving the UL Tx Timing Advance Command from the eNB, determining whether the UL Tx data are supposed to be transmitted through a D2D link, transmitting, when the UL Tx data are supposed to be transmitted through the D2D link, the data by applying the UL Tx Timing Advance Command, and transmitting, when the UL Tx data are not supposed to be transmitted through the D2D link, the data without applying the UL Tx Timing Advance Command.

The TAG control unit 1033 may also control starting a timer for determining validity of the received UL Tx Timing Advance Command, determining, when the timer expires, whether the timer is associated with the primary Timing Advance Group (pTAG), flushing, when the timer is associated with the pTAG, HARQ buffers of all serving cells with the exception of the HARQ buffers for transmission through the D2D link, and flushing, when the timer is not associated with the pTAG, the HARQ buffers of the corresponding serving cells with the exception of the HARQ buffers for transmission through the D2D link.

In the case when the UL Tx data is not supposed to be transmitted through the D2D link, the TAG control unit 1033 may control transmitting, when the timer is associated with the pTAG, the UL Tx data in correspondence to the UL Tx Timing Advance Command included in the random access response received through the PCell and transmitting, when the timer is not associated with the pTAG, the UL Tx data in correspondence to the UL Tx Timing Advance Command included in the random access response received through the corresponding serving cell.

According to an embodiment, the controller 1030 may control receiving data through the logical channels of the UE for the multiplexing operation, determining whether the transport block for the data is supposed to be transmitted through the D2D link, and multiplexing, when the transport block is supposed to be transmitted through the D2D link, data received through the D2D-dedicated logical channels.

The controller 1030 may also control multiplexing, when the transport block for the data is supposed to be transmitted through a non-D2D-dedicated logical channel(s), the data received through non-D2D-dedicated logical channel(s).

The controller 1030 may also control multiplexing the data having the same identity, among the received data, into the same transport block. At this time, the identity information may include the identity information of the target UE which is supposed to receive the multiplexed transport block.

According to an embodiment of the present invention, the controller 1030 may control receiving data from the upper sublayer of the UE for control signal transmission, determining whether there are data received through the D2D-dedicated logical channel among the received data, and transmitting, when there are data received through the D2D-dedicated logical channel, a D2D-dedicated control message to the eNB serving the UE. At this time, the D2D-dedicated control message may include a D2D-dedicated buffer status report MAC CE (BSR MAC CE).

The controller 1030 also may control measuring, when the BSR is triggered, the status of the buffer buffering data received through the D2D-dedicated logical channel and generating the D2D-dedicated BSR MAC CE. At this time, the D2D-dedicated BSR MAC CE may include the logical channel group information and per-logical channel group buffer size information.

The BSR trigger may include the BSR request for the data received through the D2D-dedicated logical channel and the BSR request for the data received through the non-D2D-dedicated logical channel.

The controller 1030 may also control calculating per-logical channel group buffer sizes for the data received through the non-D2D-dedicated logical channels and transmitting a normal BSR message including the calculated buffer size information.

The D2D-dedicated control message may include a D2D-dedicated scheduling request message for requesting resources from the eNB serving the UE in order to transmit the data received through the D2D-dedicated logical channel.

Although the description is directed to the case where the controller 1030, SR control unit 1301, BSR control unit 1032, and TAG control unit 1033 are configured as separate blocks for the respective functions, for the convenience of explanation, it is not mandatory that the functions are separated as depicted. For example, the functions of the controller 1030, SR control unit 1301, BSR control unit 1032, and TAG control unit 1033 may be performed by the controller 1030 integrally.

Figure 11:
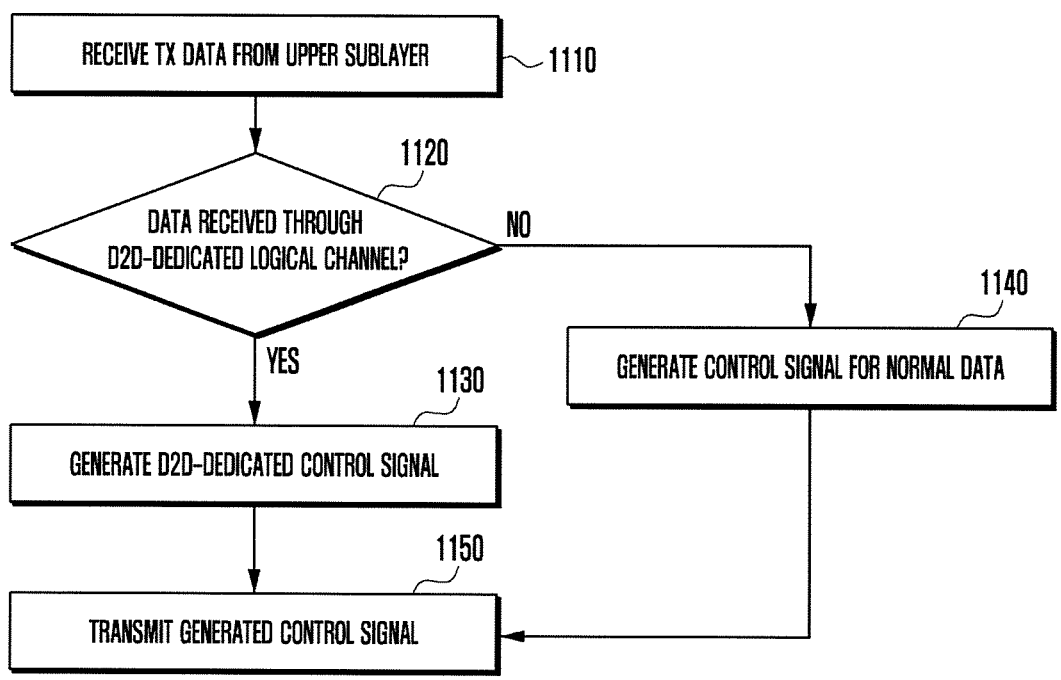
FIG. 11 is a flowchart illustrating a control signal transmission method of the UE supporting D2D communication according to an embodiment of the present invention.

FIG. 11 is a flowchart illustrating a control signal transmission method of the UE supporting D2D communication according to an embodiment of the present invention.

Referring to FIG. 11, an upper sublayer of the UE generates data to be transmitted outside of the UE at step 1110. The UE determines whether there are data received through a D2D-dedicated logical channel among the data generated by the upper layer at step 1120.

If there are data received through a D2D-dedicated logical channel, the UE generates a D2D-dedicated control signal at step 1130. At step 1130, the UE may generate not only the D2D-dedicated control signal but also other signals. That is, the UE may generate not only the D2D-dedicated control channel data received through the D2D-dedicated logical channel but also the control signal for the normal data received through non-D2D-dedicated logical channels. The control signal for the normal data may be the signal for the data to be transmitted through the 3GPP network other than the D2D link.

If there is no data received through the D2D-dedicated logical channel, the procedure goes to step 1140. At step 1140, the UE may generate the control signal for the normal data received through the non-D2D-dedicated logical channel.

At step 1150, the UE transmits the control signal generated at step 1130 or 1140 to the eNB.

As described with reference to FIG. 11, the control signal transmission method according to an embodiment of the present invention is capable of determining whether the data generated from the upper layer of the UE are delivered through the D2D-dedicated logical channel and generating the D2D-dedicated control signal depending on the determination result.

Examples of the control signal may include a scheduling request (SR) control message and a BSR control message. The descriptions of detailed operations for the case where the control signal is the SR control message have been made with reference to FIG. 5. Also, the descriptions of detailed operations for the case where the control signal is the BSR control message have been made with reference to FIGS. 7A&7B.

Although various preferred embodiments of the present invention have been described in detail, it will be appreciated by those skilled in the art that variations changes and modification may be made without departing from the spirit of the invention or the scope of the appended claims.

What is claimed is:

1. A method for device to device (D2D) communication by a source terminal, the method comprising:
    generating first information to be transmitted via the D2D communication;
    transferring the first information from an upper layer to a lower layer of the source terminal via a D2D dedicated logical channel;
    generating a first medium access control (MAC) control element (CE) for a D2D BSR of the D2D communication based on the first information;
    generating a second MAC CE for a BSR of a cellular network communication based on second information to be transmitted via the cellular network communication; and
    transmitting a second MAC CE for a BSR of the cellular network communication prior to the first MAC CE for the D2D BSR of the D2D communication based on an identification that a priority of the second MAC CE for the BSR of the cellular network communication is higher than a priority of the first MAC CE for the D2D BSR of the D2D communication.

2. The method of claim 1, further comprising:
    generating the second information to be transmitted via the cellular network communication;
    transferring the second information from the upper layer to the lower layer of the source terminal via a logical channel for the cellular network communication; and
    transmitting the second information to a target terminal via the cellular network communication.

3. The method of claim 1, further comprising:
    multiplexing the first information received via the D2D dedicated logical channel without the second information received via a logical channel for the cellular network communication; and
    multiplexing the second information without the first information.

4. The method of claim 1, further comprising:
    multiplexing the first information based on an identity of the source terminal and an identity of a target terminal.

5. The method of claim 1, further comprising:
    buffering the first information received via the D2D dedicated logical channel to a first buffer without the second information received via a logical channel for the cellular network communication; and
    buffering the second information to a second buffer without the first information.

6. The method of claim 5, wherein the first MAC CE for the D2D BSR includes information about an amount of data available for transmission in the first buffer of the source terminal.

7. The method of claim 1, further comprising:
    transmitting scheduling request for the first MAC CE; and
    transmitting the first MAC CE based on uplink resource received based on the scheduling request.

8. The method of claim 1, wherein the first MAC CE includes a first MAC sub-header, and
    wherein a logical channel identity included in the first MAC sub-header indicates that the first MAC CE includes the BSR.

9. The method of claim 1, wherein the source terminal includes a first MAC entity for the D2D communication and a second MAC entity for the cellular network communication.

10. A source terminal for device to device (D2D) communication, the source terminal comprising:
    a transceiver configured to transmit and receive a signal; and
    a controller configured to:
        generate first information to be transmitted via the D2D communication,
        transfer the first information from an upper layer to a lower layer of the source terminal via a D2D dedicated logical channel,
        generate a first medium access control (MAC) control element (CE) for a D2D BSR of the D2D communication based on the first information,
        generate a second MAC CE for a BSR of a cellular network communication based on second information to be transmitted via the cellular network communication, and
        transmit a second MAC CE for a BSR of the cellular network communication prior to the first MAC CE for the D2D BSR of the D2D communication based on an identification that a priority of the second MAC CE for the BSR of the cellular network communication is higher than a priority of the first MAC CE for the D2D BSR of the D2D communication.

11. The source terminal of claim 10, wherein the controller is further configured to:
    generate the second information to be transmitted via the cellular network communication,
    transfer the second information from the upper layer to the lower layer of the source terminal via a logical channel for the cellular network communication, and
    transmit the second information to a target terminal via the cellular network communication.

12. The source terminal of claim 10, wherein the controller is further configured to:
    multiplex the first information received via the D2D dedicated logical channel without the second information received via a logical channel for the cellular network communication, and
    multiplex the second information without the first information.

13. The source terminal of claim 10, wherein the controller is further configured to multiplex the first information based on an identity of the source terminal and an identity of a target terminal.

14. The source terminal of claim 10, wherein the controller is further configured to:
    buffer the first information received via the D2D dedicated logical channel to a first buffer without the second information received via a logical channel for the cellular network communication, and
    buffer the second information to a second buffer without the first information.

15. The source terminal of claim 14, wherein the first MAC CE for the D2D BSR includes information about an amount of data available for transmission in the first buffer of the source terminal.

16. The source terminal of claim 10, wherein the controller is further configured to:
    transmit scheduling request for the first MAC CE, and
    transmit the first MAC CE based on uplink resource received based on the scheduling request.

17. The source terminal of claim 10, wherein the first MAC CE includes a first MAC sub-header, and
  wherein a logical channel identity included in the first MAC sub-header indicates that the first MAC CE includes the BSR.

18. The source terminal of claim 10, wherein the source terminal includes a first MAC entity for the D2D communication and a second MAC entity for the cellular network communication.

* * * * *